US007942261B2

(12) United States Patent
Heuser et al.

(10) Patent No.: US 7,942,261 B2
(45) Date of Patent: May 17, 2011

(54) MULTI-DISC MEDIA CASE

(75) Inventors: Mark E. Heuser, Strongsville, OH (US); Jesse D. Wells, Canton, OH (US)

(73) Assignee: Atlas AGI Holdings LLC, Greenwich, CT (US)

( * ) Notice: Subject to any disclaimer, the term of this patent is extended or adjusted under 35 U.S.C. 154(b) by 476 days.

(21) Appl. No.: 11/349,055

(22) Filed: Feb. 7, 2006

(65) Prior Publication Data
US 2006/0191809 A1    Aug. 31, 2006

Related U.S. Application Data

(60) Provisional application No. 60/650,633, filed on Feb. 7, 2005.

(51) Int. Cl.
B65D 85/57 (2006.01)
(52) U.S. Cl. .............. 206/310; 206/308.1; 206/312
(58) Field of Classification Search ............ 206/303, 206/308.1, 309, 307, 310, 312, 493; 211/40, 211/41.12
See application file for complete search history.

(56) References Cited

U.S. PATENT DOCUMENTS

| | | | |
|---|---|---|---|
| 4,535,888 A | 8/1985 | Nusselder | |
| 4,614,269 A | 9/1986 | Dietze | |
| 4,753,347 A | 6/1988 | Bellante et al. ............ 206/387.1 |
| 4,903,829 A | 2/1990 | Clemens | |
| D323,116 S | 1/1992 | Dart et al. ...................... D9/447 |
| 5,168,991 A | 12/1992 | Whitehead et al. ........... 206/758 |
| 5,377,825 A | 1/1995 | Sykes | |
| 5,477,960 A | 12/1995 | Chen | |
| 5,558,220 A | 9/1996 | Gartz | |
| D379,413 S | 5/1997 | Swanick ........................ D6/627 |
| 5,626,225 A | 5/1997 | Joyce | |
| 5,813,526 A * | 9/1998 | Grobecker et al. ........ 206/308.1 |
| 5,887,713 A | 3/1999 | Smith et al. ................ 206/308.1 |
| 5,906,276 A * | 5/1999 | Bolognia et al. ........... 206/308.1 |
| 5,944,181 A | 8/1999 | Lau ............................ 206/308.1 |
| 5,950,822 A * | 9/1999 | Cloran et al. ................. 206/310 |
| 6,041,922 A | 3/2000 | Kollinek | |
| 6,065,593 A | 5/2000 | Howerton et al. ............ 206/310 |
| D426,721 S | 6/2000 | Benden et al. ................ D6/407 |
| 6,116,417 A | 9/2000 | Yoshinaga et al. ........... 206/310 |
| D434,777 S | 12/2000 | Peterson et al. | |
| 6,179,120 B1 * | 1/2001 | Chou ........................ 206/308.1 |
| D439,435 S | 3/2001 | Belden et al. ................. D6/407 |
| 6,196,384 B1 | 3/2001 | Belden | |
| 6,227,363 B1 | 5/2001 | Lu ............................. 206/308.1 |
| 6,237,763 B1 | 5/2001 | Lau | |
| 6,241,089 B1 | 6/2001 | Grobecker | |
| 6,283,280 B1 | 9/2001 | Wong | |
| 6,283,286 B1 | 9/2001 | Hu ................................ 206/310 |
| D451,299 S | 12/2001 | Cheng ........................... D6/407 |
| D452,793 S | 1/2002 | Lee ............................... D6/632 |
| D453,081 S | 1/2002 | Yu ................................. D6/407 |
| 6,354,435 B1 | 3/2002 | Belden | |

(Continued)

Primary Examiner — David T Fidei
(74) Attorney, Agent, or Firm — McDermott Will & Emery LLP

(57) ABSTRACT

The present invention provides a media storage case that is configured to resiliently hold up to six media discs on a single hub. In one construction, a first panel and a second panel are joined by a hinge and configured to securely hold up to six media discs on a common hub through transit and distribution, using a cantilevered disc retention finger and/or a spine disc retention fin. The media storage case can hold multiple media discs and accompanying literature, while having a minimized case thickness.

15 Claims, 4 Drawing Sheets

U.S. PATENT DOCUMENTS

| | | | |
|---|---|---|---|
| 6,398,022 B1 * | 6/2002 | Mou et al. | 206/308.1 |
| 6,419,084 B1 | 7/2002 | Sandor | 206/308.1 |
| 6,425,481 B1 | 7/2002 | Choi | 206/308.1 |
| D464,974 S | 10/2002 | Abeyta et al. | |
| D465,673 S | 11/2002 | Marsilio et al. | D6/407 |
| 6,478,150 B1 * | 11/2002 | Sølling | 206/308.1 |
| D466,718 S | 12/2002 | Abeyta, Jr. et al. | |
| D469,622 S | 2/2003 | Marsilio et al. | D6/407 |
| 6,516,945 B2 | 2/2003 | Myszka | |
| 6,516,946 B1 | 2/2003 | Kang et al. | 206/310 |
| 6,547,068 B2 | 4/2003 | Chu | 206/310 |
| 6,550,612 B2 | 4/2003 | Tajima | |
| D478,736 S | 8/2003 | Scanlan | D6/407 |
| 6,609,614 B1 * | 8/2003 | Huang | 206/308.1 |
| D480,589 S | 10/2003 | Wang | |
| 6,648,135 B2 * | 11/2003 | Ho | 206/308.1 |
| 6,681,930 B1 * | 1/2004 | Yang | 206/310 |
| 6,688,463 B2 | 2/2004 | Peterson et al. | |
| 6,712,203 B2 | 3/2004 | Chung | |
| 6,719,133 B2 | 4/2004 | Perez et al. | 206/308.2 |
| 6,729,469 B1 * | 5/2004 | Yau et al. | 206/308.1 |
| 6,732,862 B1 | 5/2004 | Hu | 206/310 |
| D495,913 S | 9/2004 | Hsiao | D6/635 |
| 6,799,677 B2 | 10/2004 | Marsilio | |
| 6,808,065 B2 | 10/2004 | Chang | |
| D498,606 S | 11/2004 | Chow | D6/407 |
| 6,863,176 B2 | 3/2005 | Farrar et al. | |
| 6,951,278 B2 | 10/2005 | Pettigrew | |
| 2001/0000599 A1 | 5/2001 | Belden, Jr. | 206/310 |
| 2001/0037953 A1 * | 11/2001 | Gelardi | 206/310 |
| 2002/0040857 A1 * | 4/2002 | Ho et al. | 206/310 |
| 2002/0130056 A1 * | 9/2002 | Pijanowski et al. | 206/310 |
| 2002/0153266 A1 | 10/2002 | Havens | 206/310 |
| 2003/0000856 A1 * | 1/2003 | Lax et al. | 206/310 |
| 2003/0006205 A1 * | 1/2003 | Seltzer | 211/40 |
| 2003/0015441 A1 * | 1/2003 | Kang et al. | 206/310 |
| 2003/0015442 A1 | 1/2003 | Chu | 206/310 |
| 2003/0034258 A1 * | 2/2003 | Lee | 206/308.1 |
| 2003/0034260 A1 | 2/2003 | Chang | 206/310 |
| 2003/0052024 A1 * | 3/2003 | Farrar et al. | 206/310 |
| 2003/0062276 A1 | 4/2003 | Chung | 206/310 |
| 2003/0075463 A1 | 4/2003 | Perez et al. | 206/310 |
| 2003/0234192 A1 * | 12/2003 | Yang et al. | 206/310 |
| 2004/0099549 A1 | 5/2004 | Hu | 206/308.1 |
| 2004/0112773 A1 | 6/2004 | Chu | 206/310 |
| 2004/0159563 A1 | 8/2004 | Hui | 206/310 |
| 2004/0178091 A1 | 9/2004 | Lau | |
| 2005/0035012 A1 * | 2/2005 | Sagawa et al. | 206/307 |
| 2005/0056556 A1 | 3/2005 | Perez et al. | 206/308.1 |
| 2005/0115847 A1 | 6/2005 | Wawrzynowski | 206/308.1 |
| 2005/0167302 A1 * | 8/2005 | Bjerregaard et al. | 206/308.1 |
| 2005/0279657 A1 * | 12/2005 | Bjerregaard et al. | 206/308.1 |
| 2006/0021899 A1 * | 2/2006 | Bjerregaard et al. | 206/524.1 |

* cited by examiner

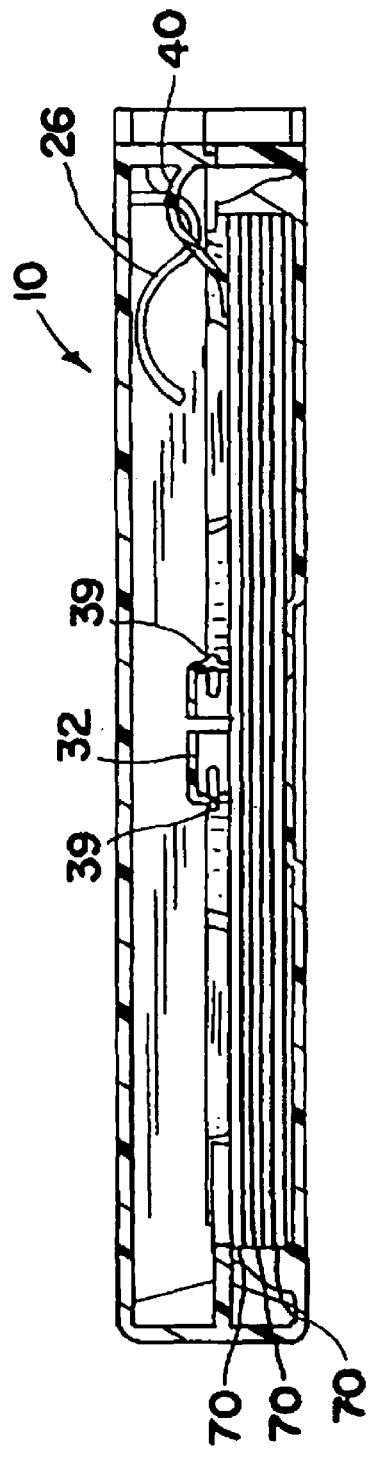
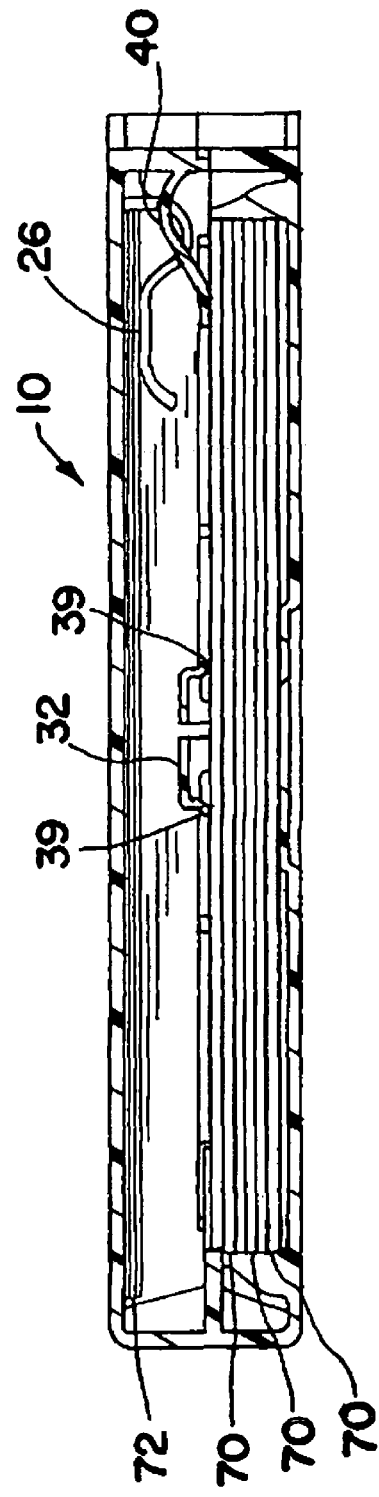
FIG. 6
FIG. 7

MULTI-DISC MEDIA CASE

CROSS REFERENCE TO RELATED APPLICATION

This application claims priority from U.S. Provisional Patent Application Ser. No. 60/650,633 filed Feb. 7, 2005; the disclosure of which is incorporated herein by reference.

BACKGROUND OF THE INVENTION

1. Technical Field

The invention described herein relates generally to storage cases for recorded media and, more particularly, to a media storage case for securely holding a variable number of media discs on a common retention hub.

2. Background Information

Movie and music collections are becoming increasingly popular in today's marketplace. Such collections typically include multiple items of recorded media, such as DVDs and CDs, packaged together along with printed literature. One example of a multiple-disc media product is a musical "box set" from a particular artist that may be recorded on two, three, four or more CDs. Another example is an unabridged audio book that may be recorded on six or more CDs. A further example is a group of related movies recorded on multiple DVDs. In addition, video games, typically for use on personal computers or home video game systems, continue to grow in popularity and sophistication. Such video games typically include multiple recorded media items, e.g., DVDs or CDs, and printed literature, such as instruction manuals.

A wide variety of multi-disc media storage cases exist in the art. One type of conventional multi-disc media storage case includes multiple pages or inserts that are employed to hold the media discs. In these conventional cases, each page or insert holds one or, at most, two media discs. The use of multiple pages or inserts typically results in thicker storage cases, which is generally undesirable. When the storage case is adapted to accommodate printed literature, the overall thickness increases further.

Another type of conventional media storage case includes a rigid fin extending from a spine portion and a rigid tab-like fin attached to a front panel or cover, where the two fins cooperate to hold a predetermined number of media discs on a common hub. This type of conventional case is suitable for holding a fixed number of media discs, e.g., one disc or three discs, but it lacks the flexibility to accommodate a variable number of media discs.

SUMMARY OF THE INVENTION

The present invention provides a media storage case that is configured to resiliently hold three, four, five or more media discs on a common hub. The media storage case includes a storage case body having two halves connected by a hinge with the body including a media disc retention hub adapted to resiliently hold between three and six media discs.

In one configuration, a pair of panels are hingedly connected and configured to securely hold up to six media discs on a common hub through transit and distribution, using a flexible cantilevered disc retention finger and/or a spine disc retention fin. The media storage case can hold multiple media discs and accompanying literature, while having a minimized case thickness. The media storage case can retain a variable number of media discs, while preventing axial shifting of the retained media discs.

According to one aspect of the invention, a media storage case includes a first panel and a second panel joined by a hinge that allows relative pivoting of the first and second panels between a closed condition and an open condition. The first panel has a disc support and a hub projecting from the disc support, the hub having at least one retention lip spaced from the disc support. The second panel has a flexible retention member which has a disc engaging end that extends to an elevation lower than the lip on the hub when the case is closed.

According to another aspect of the invention, a media storage case includes a first panel and a second panel joined by a hinge that allows relative pivoting of the first and second panels between a closed condition and an open condition. The second panel has a disc support and a hub projecting from the disc support, and the first panel has a flexible retention member that extends inwardly from an outer wall a distance of at least about three-eighths (3/8) inch when the case is closed.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

BRIEF DESCRIPTION OF DRAWINGS

These and further features of the present invention will be apparent with reference to the following description and drawings, wherein:

FIG. 6 is a cross-sectional view of a media storage case holding five media discs in a closed configuration; and FIG. 7 is a cross-sectional view of a media storage case holding six media discs and literature in a closed configuration.

Similar numbers refer to similar parts throughout the specification.

DISCLOSURE OF INVENTION

Figure 1:
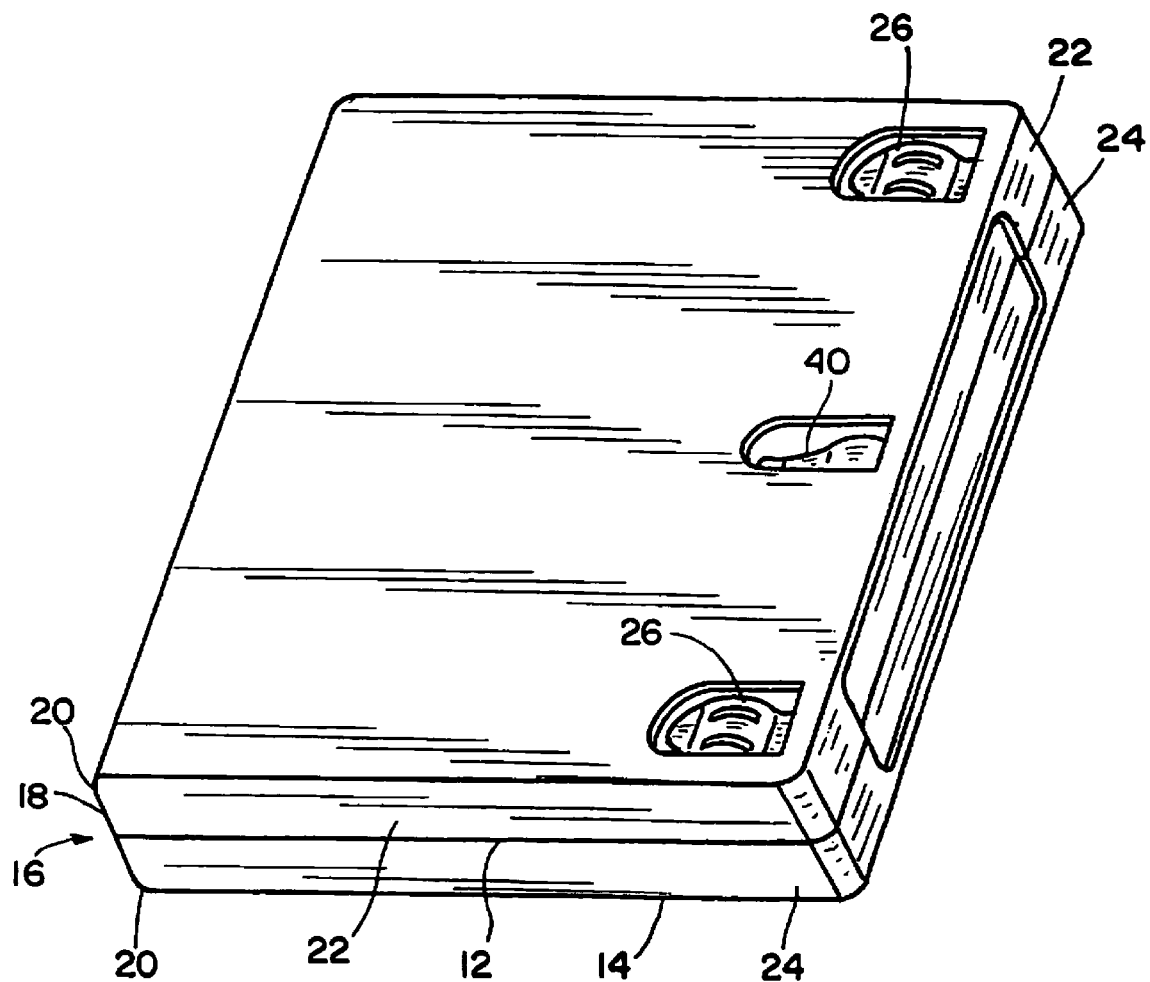
FIG. 1 is a perspective view of a media storage case in accordance with an exemplary embodiment of the present invention.
Figure 2:
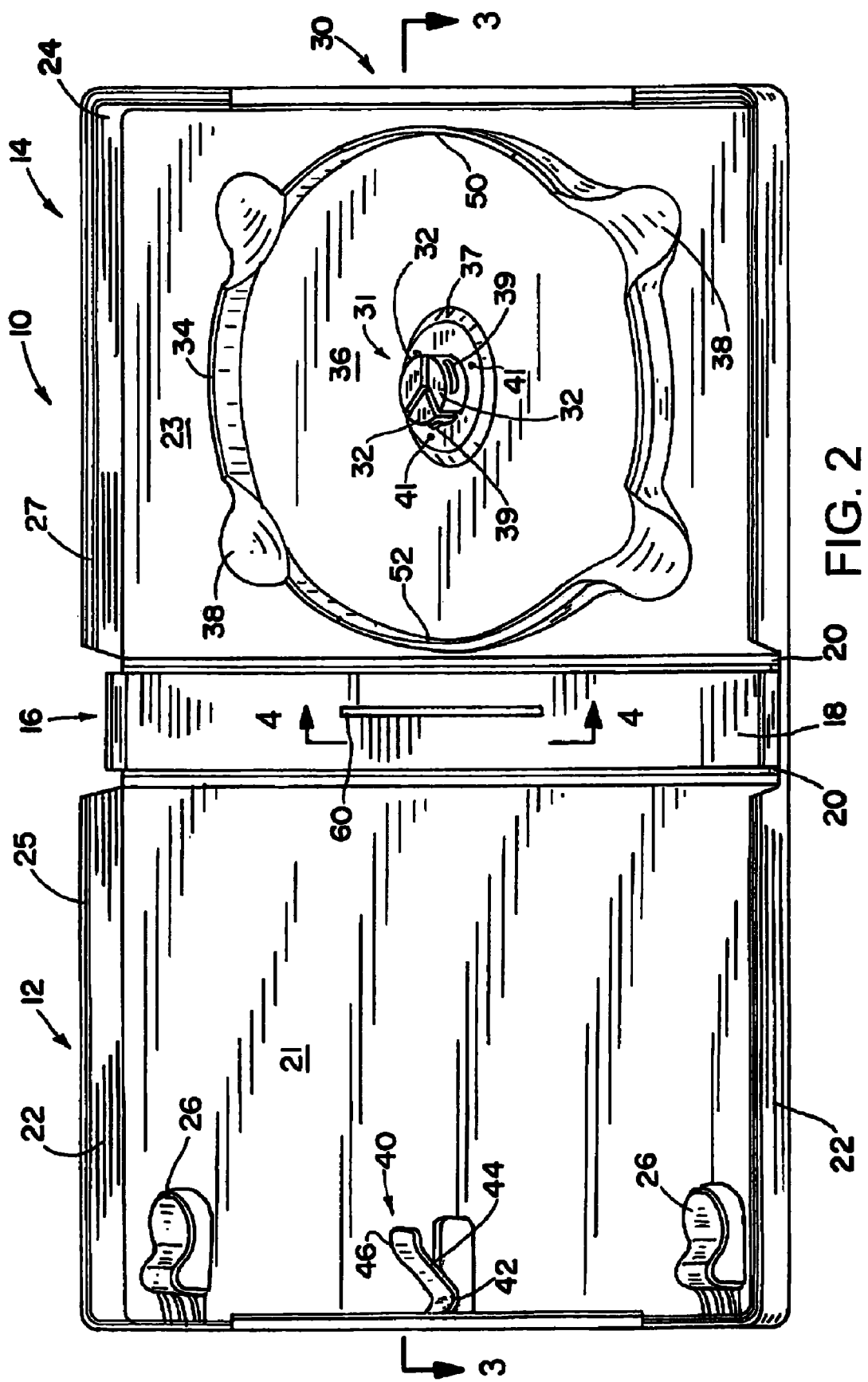
FIG. 2 is a perspective view of the media storage case of FIG. 1 in an open configuration.

In the detailed description that follows, corresponding components have been given the same reference numerals regardless of whether they are shown or described in connection with different embodiments of the present invention. To illustrate the present invention in a clear and concise manner, the drawings may not necessarily be to scale and certain features may be shown in somewhat schematic form.

An exemplary media storage case according to the present invention is indicated generally by the numeral 10 in the accompanying drawings. The media storage case 10 includes a first panel 12 and a second panel 14 joined by a hinge 16 that allows relative pivoting of the first and second panels 12 and 14 between a closed condition and an open condition. The hinge 16 can include a hinge wall 18 and a pair of living hinges 20, although other types of hinges can be used if desired. As described below, each panel 12, 14 can be adapted to provide recorded media retention functionality (of up to six media discs) as well as literature retention functionality. In a preferred embodiment, the panels and hinges of the storage case are of a unitary construction formed, for example, by molding the same from plastic material.

The first panel 12 can include a bottom wall 21 and a sidewall 22 that extends along three sides of the bottom wall 21. The sidewall can optionally include reinforcing ribs. As is described more fully below, the sidewall 22 of the first panel 12 can define a compartment for receiving printed literature, such as an instruction booklet. The second panel 14 can include a bottom wall 23 and a sidewall 24 that extends along three sides of the bottom wall 23 (with optional reinforcing ribs). In one embodiment, the sidewalls 22 and 24 have approximately equal heights, e.g., about one-half inch (1.3 cm). At least one of the first and second panels 12 and 14 can include latches, detents or other releasable fastening means to hold the media storage case in a closed position. The sidewalls 22 and 24 can include respective cooperative recessed portions 25 and 27 that engage or otherwise cooperate when the case is closed. Artisans will appreciate that the media storage case can be made from a wide variety of materials, such as a relatively strong, break-resistant plastic. In one embodiment, the media case is made at least partly from a transparent or translucent material. Alternatively, the storage case can be made from a relatively opaque material.

First panel 12 may include one or more literature retention devices, such as literature clips 26. Each literature clip 26 may be cantilevered from or otherwise connected to a portion of the first panel 12. The literature clips 26 can be cantilevered from a portion of the sidewall 22 or a portion of the bottom wall 21 adjacent the bottom of the sidewall 22 in order to resiliently hold literature of varying thickness.

Second panel 14 includes a recorded media disc retention well 30. The recorded media retention well 30 may include an integral media retention hub 31, which, as is described more fully below, has a height that is sufficient to accommodate up to six media discs having a standard thickness, e.g., approximately 1.2 millimeters or 0.050 inches. Of course, the so-called standard thickness of a media disc can very slightly due to, for example, the variations in thickness of labels placed on the media disk and the like. The media retention hub 31 can be substantially surrounded by an outer wall 34 that is sized to receive a number of media discs, thereby providing a deep disc well 30 for receiving a plurality of media discs.

The outer wall 34 can be discontinuous, for example, having or otherwise defining one or more access grooves or slots 38 that allow a user to remove one or more items of recorded media from the hub 31 with relative ease. Optionally, hub 31 may include a support portion 37 (also referred to as a disk support) that extends upward from or otherwise be elevated relative to the inner portion 36 of bottom wall 23 within deep disc well 30. A top surface of the support portion 37 can include or otherwise define a plurality of raised nubs or bumps 41. The plurality of raised nubs 41 can minimize contact between the bottom media disc and the well 30, thereby minimizing friction between the bottom media disc and the well 30 and/or the top surface of the support portion 37.

The hub 31 can be generally cylindrical in shape, including a generally cylindrical sidewall (free of projections under lip 39) and a flat top wall disposed perpendicular to the sidewall. A plurality of radial slots extend through the top wall and the cylindrical sidewall of the hub 31, thereby defining a plurality of fingers 32, e.g., three slots defining three fingers. The slots may be configured to define three equally-sized fingers. The radial slots allow the plural fingers 32 to flex radially inwardly allowing a user to remove a media disc from the hub 31 and replace a media disc on the hub 31. The plural fingers are resilient enough to allow for the repetitious removal and replacement of media discs. In a preferred embodiment, the slots can be in the shape of a "Y" or a "peace symbol." This can be referred to as a "pluck-type hub." The hub 31 and support portion 37 may be integrally formed with the second panel 14.

One or more of the plural fingers 32 may include a retention lip 39 (also referred to as a protrusion or retention ridge) to help prevent one or more of the media discs from unintentionally disengaging from the hub 31. In one embodiment, multiple retention lips are disposed at various positions along the lengths of one or more of the cylindrical sidewalls of the plural fingers. As discussed above, the radial slots separate the hub into three fingers that can flex slightly to allow the retention lips 39 to move inwardly allowing passage of each media disc thereover, and then to move back to axially capture the media disc between the retention lips 39 and the raised support portion 37.

Figure 3:
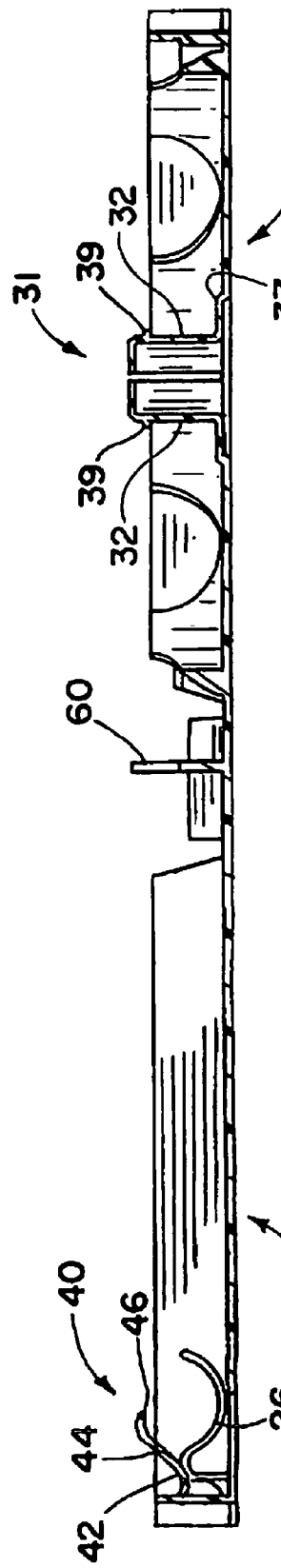
FIG. 3 is a section view taken along line 3-3 of FIG. 2.
Figure 4:
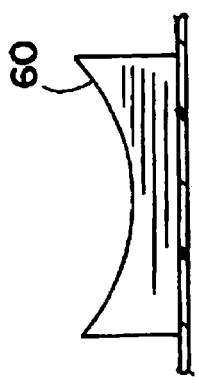
FIG. 4 is a section view taken along line 4-4 of FIG. 2.

The hub 31 extends upward from the inner portion 30 of bottom wall 23 and/or the top surface of the support portion 37 (or the tops of the raised nubs 41) to a height that is greater than the combined thickness of six standard media discs. In one configuration, the hub projects or otherwise extends to an elevation above the top edges of the sidewall 24 as shown in FIG. 3 wherein the bottom edges of lips 39 are aligned with the upper edge of sidewall 24. In one exemplary embodiment, the hub 31 has a height of no more than about 0.50 inches. It is to be appreciate that the hub may be of a lesser or greater height to accommodate, for example, up to six media discs or greater than six media discs. In one embodiment, the hub 31 includes one or more retention lips 39 spaced from the top of the support portion 37 (or the raised nubs 41 of the support portion 37) by a distance that is approximately equivalent to the collective thickness of six media discs of standard thickness, e.g., about 0.30 inches.

In one configuration of the invention, a disc retention finger 40 is provided to hold the media discs snugly on hub 31. Disc retention finger 40 is cantilevered from a portion of the first panel 12, such as from a portion of the sidewall 22. In the exemplary embodiment, finger 40 is connected to the upper half of sidewall 22. In alternative configurations, finger 40 may be connected to the exact middle or the lower portion of sidewall 22 adjacent bottom wall 21. The cantilevered disc retention finger 40 is configured such that it can resiliently accommodate and retain a variable number, e.g., up to six, media discs on the retention hub 31.

Finger 40 generally includes a first or bottom portion 42 that is cantilevered from sidewall 22 (or optionally the bottom wall 21 of the first panel adjacent sidewall 22). The first portion 42, which extends generally perpendicularly from the sidewall 22, can have a curved shape that initially extends at an acute angle from the sidewall 22 toward the bottom wall 21 in a quasi-tangential fashion, and then gradually transitions into an inclined or angled portion 44. The curved first portion 42 can provide a rolling flexible hinge for resiliently holding or retaining a variable number of media discs on retention hub 31. The inclined portion 44 extends away from the sidewall 22 and the bottom wall 21 and gradually transitions into a rounded top portion 46, which comes into contact with an uppermost media disc when the case is in a closed position. As illustrated, the first portion 42 of the finger 40 is displaced or otherwise disposed away from the bottom wall 21 of the first panel 12 by a distance that is sufficient to accommodate an item of printed literature, such as an instruction booklet. The cantilevered disc retention finger may be integrally formed with sidewall 22 and, optionally, may pivot with respect to sidewall 22 about, for example, a living hinge.

The finger 40 is substantially resilient such that, when the case is in a closed position, the finger 40 is spaced apart from the top surface of the support portion 37 by a distance that is less than about the combined thickness of, for example, three media discs, in one embodiment, four media discs, in another embodiment, five media discs, in another embodiment, and six media discs, in yet another embodiment. With standard thickness media discs, the spacing between the finger 40 and the top surface of the support portion 37 is less than about 0.15 inch, in one embodiment, about 0.20 inch, in another embodiment, about 0.25 inch, in another embodiment, and about 0.30 inch, in yet another embodiment. In a preferred embodiment, the spacing between the finger 40 and the top surface of the support portion 37 is sufficiently less than the thickness of three standard thickness media discs to provide retention of the discs on the hub 31. In this configuration, once a plurality of media discs are stored on the retention hub 31, the top portion 46 of the finger 40 comes into contact with the uppermost media disc, and thereby forces the finger 40 toward the bottom wall 21 of the first panel 12.

It is to be appreciated that other cantilevered resilient finger geometries may be employed in order to resiliently hold a variable number of media discs within the disc well 30. In the illustrated embodiment, outer wall 34 includes or otherwise defines a first recessed portion 50 in order to accommodate the cantilevered disc retention finger 40 when the storage container is in the closed position. The retention finger 40 projects or otherwise extends radially inward from outer wall 34 to engage the uppermost media disc radially inward from the perimeter of the media disc. Engaging the uppermost media disc radially inward from the outer wall 34 provides a more secure retention of the variable number of media discs on the hub 31.

Preferably, the contact point between the top portion 46 of the finger 40 and the uppermost media disc is about one-half (½) inch radially inward from outer wall 34. Alternatively, the contact point between the top portion 46 of the finger 40 and the uppermost media disc is, in one embodiment, about one-quarter (¼) inch, in another embodiment, about three-eighths (⅜) inch, and in yet another embodiment, about three-quarters (¾) inch radially inward from outer wall 34.

The hinge wall 18 can include an integrally formed spine disc retention fin 60, which extends from the hinge wall 18. When the media storage case is in a closed position, the spine disc retention fin 60 extends radially inward and cooperates with the retention hub 31 and the cantilevered disc retention finger 40 to securely and/or resiliently hold the media discs on the hub. In one embodiment, the spine disc retention fin can include a curved upper portion, which curvature may correspond approximately to the curvature of an outer portion of a media disc.

The outer wall 34 may include or otherwise define a second recess 52 to accommodate the spine disc retention fin 60 when the storage case is in the closed position. In one embodiment, the bottom surface of the fin 60 is at the same elevation as the bottom surfaces of the protrusions when the case is in a closed position. The spine disc retention fin 60 extends radially inward from the outer wall 34 when the case is in the closed position to retain, for example, the maximum number of media discs, e.g., six media discs, that can be retained within the disc well 30. In one embodiment, the spine disc retention fin could be replaced by a resilient, flexible finger, such as, for example, finger 40 described above. In one embodiment, the fin 60 extends about one-quarter (¼) inch or more radially inward from the outer wall when the case is in a closed position.

Figure 5:
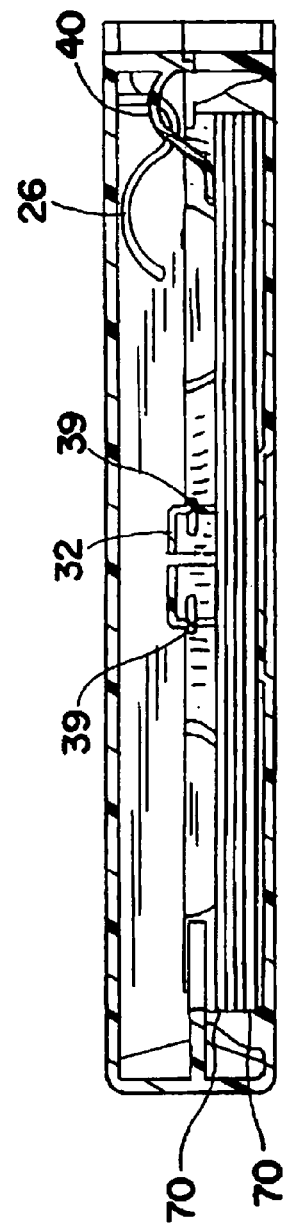
FIG. 5 is a cross-sectional view of a media storage case holding four media discs in a closed configuration.

In such closed position the media storage case can securely and resiliently hold (and prevent axial shifting of) a variable number of media discs, for example, up to six media discs, using the retention hub 31, the cantilevered retention finger 40 and/or the spine disc retention fin 60. FIGS. 5-7 illustrate an exemplary embodiment in which four, five and six media discs 70, respectively, are secured within the media case. As shown in FIG. 7, the storage case can securely hold up to six media discs, along with a sufficiently thick literature bundle, in a media case having a relatively thin overall thickness, e.g., about one inch, and an efficiently-sized footprint.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A media storage case comprising:
   a first panel and a second panel joined by a hinge that allows relative pivoting of the first and second panels between a closed condition and an open condition; the first panel having a bottom wall and a sidewall;
   the second panel having a media disc retention hub that has at least one retention lip; the media disc retention hub adapted to receive between three and six media discs; and
   the first panel having a flexible retention member having a first portion extending at an angle towards the bottom wall and a second portion connected to the first portion and being angled away from the bottom wall; the second portion having a disc engaging end that extends to an elevation lower than the lip on the media disc retention hub when the case is closed; the disc engaging end extending below the lip by a distance sufficient to retain at least three standard thickness media discs when the case is closed; the retention member being flexible such that the retention member resiliently engages stacks of three and six discs.

2. The media storage case of claim 1, wherein the disc retention hub defines a sidewall under the lip that has a height of at least equal to about the collective thickness of six standard thickness media disks.

3. The media storage case of claim 1, wherein the flexible retention member projects to an elevation above a top edge of the sidewall of the first panel when the case is open.

4. The media storage case of claim 1, wherein the disc retention hub has a height of no more than about 0.50 inch.

5. The media storage case of claim 1, wherein the second panel includes an outer wall substantially surrounding the disc retention hub, the outer wall and disc retention hub defining a media disc well.

6. The media storage case of claim 5, wherein the flexible retention member extends inwardly from the outer wall a distance of at least about three-eighths (⅜) inch when the case is closed.

7. The media storage case of claim 1, wherein the flexible retention member is spaced from a bottom wall of the first panel by a distance sufficient to accommodate literature thereunder.

8. The media storage case of claim 7, wherein the first panel includes one or more literature clips.

9. The media storage case of claim 8, wherein the hinge includes a hinge wall and a pair of living hinges; the hinge wall including a spine disc retention fin that extends radially inward when the case is closed.

10. The media storage case of claim 9, wherein the spine disc retention fin has an elevation that is substantially the same as the elevation of the retention lip when the case is closed.

11. A media storage case comprising:
a first panel and a second panel joined by a hinge that allows relative pivoting of the first and second panels between a closed condition and an open condition; the first panel having a sidewall and a bottom wall;
wherein the second panel has a media disc retention hub and an outer wall that define a media disc well adapted to receive up to six media discs; the media disc retention hub having a disc retention lip;
the first panel has a flexible retention member which has a disc engaging end that extends into the media disc well to an elevation lower than the retention lip on the media disc retention hub when the case is closed;
the flexible retention member is spaced from the bottom wall of the first panel by a distance sufficient to accommodate literature thereunder;
the flexible retention member having a curved portion that extends toward the bottom wall and an angled portion extending from the curved portion; the angled portion extending into the media disc well;
the curved portion providing a rolling flexible hinge that allows the flexible retention member to resiliently retain a variable number of media discs on the retention hub;
the first panel including a literature clip adapted to hold printed literature to the first panel; and
a spine disc retention fin connected to the hinge that extends into the media disc well when the first and second panels are in the closed condition; the spine disc retention fin having an elevation that is substantially the same as the elevation of the retention lip when the case is closed.

12. The media storage case of claim 11, wherein the retention lip has a lower surface aligned with the upper surface of the outer wall such that the outer wall protects a substantial portion of the outer edge of any media disc held on the disc retention hub.

13. A media storage case comprising:
a first panel and a second panel joined by a hinge that allows relative pivoting of the first and second panels between a closed condition and an open condition; the first panel having a bottom wall;
the second panel having a media disc retention hub and an outer wall that define a media disc well adapted to receive a plurality of media discs; the media disc retention hub having a disc retention lip;
the first panel having a flexible retention member which has a disc engaging end that extends into the media disc well to an elevation lower than the retention lip on the media disc retention hub when the first and second panels are in the closed condition;
the flexible retention member being spaced from the bottom wall of the first panel by a distance sufficient to accommodate literature thereunder;
the flexible retention member having a curved portion that extends toward the bottom wall of the first panel and an angled portion extending from the curved portion; the angled portion extending into the media disc well; and
the curved portion of the flexible retention member providing a rolling flexible hinge that allows the flexible retention member to resiliently retain a variable number of media discs on the retention hub.

14. A media storage case comprising:
a first panel and a second panel joined by a hinge that allows relative pivoting of the first and second panels between a closed condition and an open condition; the first panel having a bottom wall;
the second panel having a media disc retention hub having a disc retention lip;
the first panel having a flexible retention member which has a disc engaging end that extends to an elevation lower than the retention lip on the media disc retention hub when the first and second panels are in the closed condition;
the flexible retention member having a curved portion that extends toward the bottom wall of the first panel and an angled portion extending from the curved portion; the angled portion extending toward the second panel; and
the curved portion of the flexible retention member providing a rolling flexible hinge that allows the flexible retention member to resiliently retain a variable number of media discs on the retention hub.

15. The media storage case of claim 14, wherein the first panel includes a sidewall; the flexible retention member extending from the sidewall of the first panel in a location spaced from the bottom wall of the first panel by a distance sufficient to accommodate literature thereunder.

* * * * *